United States Patent [19]

Quick et al.

[11] Patent Number: 4,768,634

[45] Date of Patent: Sep. 6, 1988

[54] BACKDRIVE OVERLOAD RELEASE CLUTCH

[75] Inventors: David C. Quick; John Whitehouse, both of Rockford, Ill.

[73] Assignee: Sundstrand Corporation, Rockford, Ill.

[21] Appl. No.: 944,965

[22] Filed: Dec. 22, 1986

[51] Int. Cl.[4] .................... F16D 11/04; F16D 43/20
[52] U.S. Cl. .................... 192/56 R; 192/67 R; 192/150
[58] Field of Search .............. 192/89 A, 89 QT, 101, 192/114 R, 114 T, 150, 56 R, 67 R; 74/7 C, 9

[56] References Cited

U.S. PATENT DOCUMENTS

| | | | |
|---|---|---|---|
| 1,793,221 | 2/1931 | Iversen . | |
| 2,401,179 | 4/1946 | Orr | 192/67 R |
| 2,942,481 | 6/1960 | Gilbert | 192/56 R X |
| 3,217,847 | 11/1965 | Petrak | 192/31 |
| 3,221,852 | 12/1965 | Thomas | 192/56 R |
| 3,240,304 | 3/1966 | Wickersham | 192/56 R |
| 3,265,174 | 8/1966 | Polzin | 192/67 R |
| 3,738,122 | 6/1973 | Ricks | 192/56 R |
| 4,004,667 | 1/1977 | Vaitys | 192/56 R |
| 4,053,980 | 10/1977 | Poehlman | 30/381 |
| 4,261,452 | 4/1981 | Barrows | 74/7 C X |
| 4,265,347 | 5/1981 | Dischler | 192/56 R |
| 4,271,947 | 6/1981 | Gaeckle | 192/56 R X |

Primary Examiner—Rodney H. Bonck
Attorney, Agent, or Firm—Wood, Dalton, Phillips, Mason & Rowe

[57] ABSTRACT

A backdrive overload clutch mechanism which includes a rotatable drive member and a rotatable driven member mounted concentric with respect to the drive member. A pair of cooperating clutch jaws, including chamfered teeth, are provided with one jaw on each of the drive and driven members for rotation therewith and separable by relative movement between the members longitudinally of their axis of rotation. A first spring normally urges the clutch jaws into driving engagement. A tongue-and-groove disengaging device disengages the clutch jaws automatically in response to relative rotation between the clutch jaws. A second spring maintains the clutch jaws out of driving engagement when the clutch jaws are automatically disengaged.

13 Claims, 2 Drawing Sheets

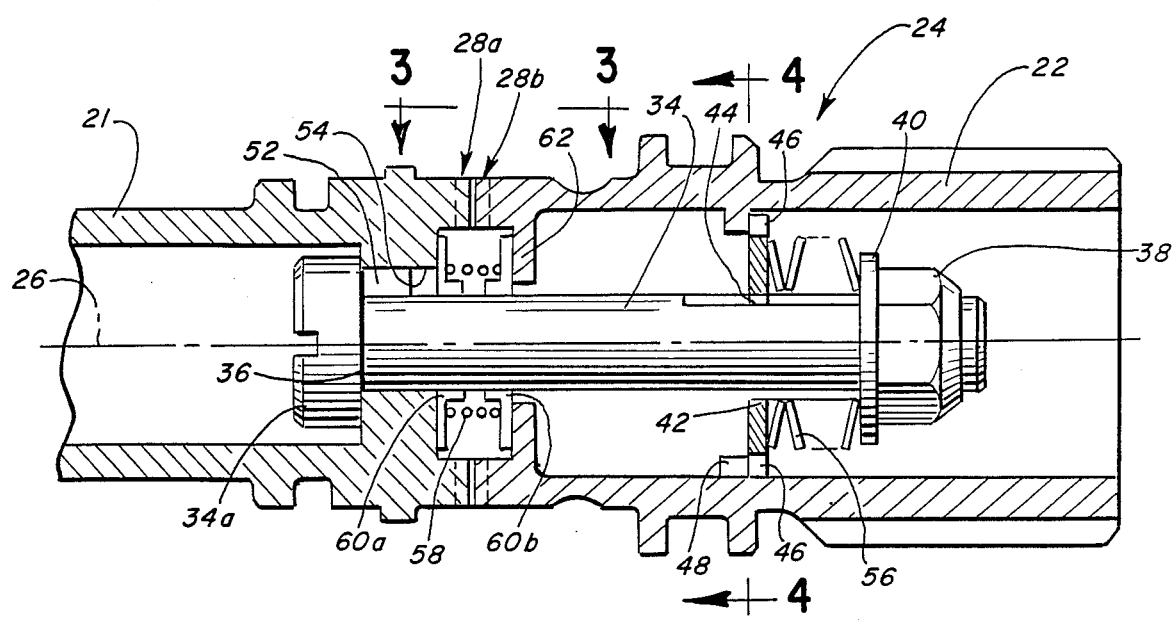
FIG. 2
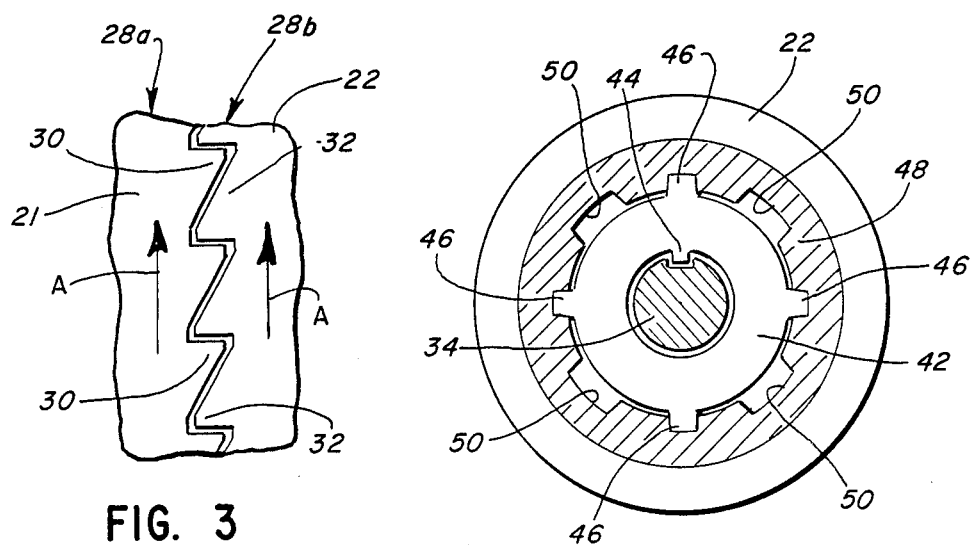
FIG. 3
FIG. 4

BACKDRIVE OVERLOAD RELEASE CLUTCH

FIELD OF THE INVENTION

This invention generally relates to clutches and, more particularly, to a backdrive overload clutch mechanism which has an automatic low reverse torque disconnect.

SUMMARY OF THE INVENTION

Various machines or power drive mechanisms require the use of a clutch between a drive member and a driven member to establish selective engagement therebetween when power or torque is applied to the drive member. In such applications, it is highly desirable that the clutch be automatically and instantaneously responsive to the application of power to the drive member to effect engagement with the driven member and to maintain such engagement until the power is removed, at which time the clutch will automatically disengage the members. This is prevalent in engaging and disengaging drive axles of vehicles, for instance. Often there may be locking means which may be automatically or manually disengaged to immobilize the clutch.

It is well known to incorporate in such clutch mechanisms a positive coupling between the drive and driven members by means of clutch jaws having concentric circular arrays of teeth. The ends of the teeth are chamfered to provide a camming effect between the teeth such that engagement of the members is prevented while relative rotation occurs between the members in a given direction. Upon reaching substantial synchronization, however, and a slight relative rotation in the opposite direction, the chamfered surfaces cause the teeth to engage to provide a positive drive. Examples of such clutch mechanisms are shown in U.S. Pat. Nos. 1,793,221 to Iversen, dated Feb. 17, 1931; 2,401,179 to Orr, dated May 28, 1946 and 3,265,174 to Polzin, dated Aug. 9, 1966. The Iversen and Polzin patents also show manual means for locking out or disengaging the clutch jaws.

All such prior art mechanisms are designed for various functions as stated. Similar types of clutches may be used in aircraft applications where a turbine driven starter drives an engine through an overrunning clutch assembly. A gearbox conventionally is coupled between the starter and the engine. Ideally, hot gases power the turbine which turns the engine to be started. Once the engine is at self-sustaining speed, the overrunning clutch disconnects the engine from the turbine to prevent high speed backdriving. The overrunning clutch also is effective to allow the engine and gearbox to continue to operate should the turbine jam. Relatively large torque is required to drive the engine. However, problems would occur and not be compensated for should malfunctions occur in the starter itself, such as bearing and overrunning clutch failures or the like. In such instances, it would be desirable to have a disconnect or "fuse" as a fail-safe feature and which is effective at a small back torque to disconnect the starter from the engine.

This invention is directed to solving the above mentioned problems and satisfying the need for such a fail-safe system.

SUMMARY OF THE INVENTION

An object, therefore, of the invention is to provide a new and improved backdrive overload clutch mechanism having a low reverse torque disconnect function to provide a last resort fuse or fail-safe feature in a high torque drive mechanism.

In the exemplary embodiment of the invention, the clutch mechanism includes a rotatable drive member and a rotatable driven member mounted concentric with respect to the drive member. Generally, a pair of cooperating clutch jaws are provided, one jaw on each of the drive and driven members for rotation therewith and separable by relative movement between the members longitudinally of their axis of rotation. First biasing means normally urge the clutch jaws into driving engagement. Means are provided for disengaging the clutch jaws automatically in response to relative rotation between the clutch jaws. Second biasing means maintain the clutch jaws out of driving engagement when the clutch jaws are automatically disengaged.

More specifically, the clutch jaws comprise an annular array of chamfered teeth concentric with the axis of rotation. Shaft means extend through the annular jaws between the drive and driven members, and the first biasing means are operatively associated between the shaft means and one of the members. The automatic disengaging means include a tongue-and-groove arrangement whereby angular alignment thereof occurs in response to relative rotation of the members to effect automatic disengagement of the members. The second biasing means is mounted to apply an axial force to bias the tongue of the arrangement through the groove to ensure the disengagement of the drive and driven members. The tongue-and-groove arrangement may be provided by radially projecting flange means on the shaft means between the members and an interior shoulder means on the other of the members.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 2 is an axial section, on an enlarged scale, of the clutch mechanism of the invention;

FIG. 3 is a fragmented, elevational layout of the chamfered teeth between the clutch jaws, taken generally in the direction of line 3—3 of FIG. 2; and FIG. 4 is a section taken generally along line 4—4 of FIG. 2, illustrating the tongue-and-groove disconnect arrangement.

DETAILED DESCRIPTION OF THE PREFERRED EMBODIMENT

Figure 1:
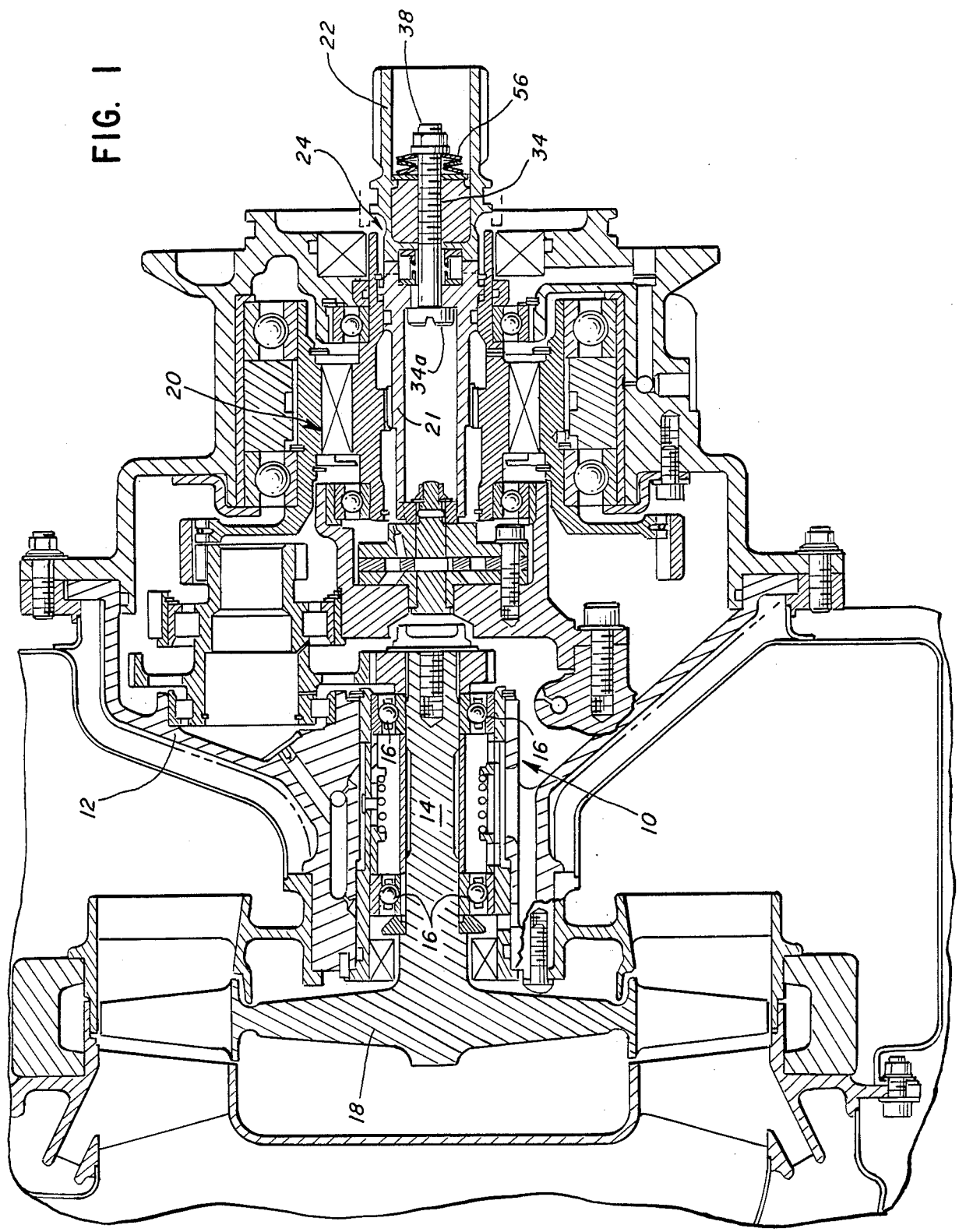
FIG. 1 is a section through a turbine-driven starter for an aircraft engine or the like, and incorporating the backdrive overload clutch mechanism of the invention.

Referring to the drawings in greater detail, the backdrive overload clutch mechanism of this invention is illustrated as incorporated in a starter for an aircraft engine, or the like, wherein the starter drives the engine through an appropriate gearbox. It should be understood that the clutch mechanism is illustrated with this application for illustration purposes and is not intended to be so limited.

More particularly, referring to FIG. 1, a turbine driven starter, generally designated 10, includes an outer housing 12 mounting a shaft 14 in bearings 16, with a turbine wheel 18 integral with the shaft. As is conventional, an overrunning clutch assembly, generally designated 20, includes a shaft 21 and is coupled between turbine shaft 14 and a splined output shaft 22. The splined output shaft conventionally leads to the aircraft engine, through an appropriate gearbox, both of which are not illustrated in the drawings. Under normal operation, hot gases power the turbine which turns the engine to be started. Once the engine is at self-sustaining speed, overrunning clutch 20 disconnects the engine from the turbine to prevent high speed backdriving. In addition, should a malfunction or jamming in the turbine occur, even during startup, clutch 20 will disengage or slip. Relatively large torque is required to drive the engine. However, should a malfunction occur in the starter or overrunning clutch itself, considerable damage could occur and this invention is directed to providing a fail-safe backdrive overload clutch mechanism, generally designated 24, which will disconnect the starter and overrunning clutch from the engine. The clutch mechanism is designed to disconnect at relatively small back torque and to remain disconnected to insure that protection is afforded to the starter and overrunning clutch. In essence, clutch mechanism 24 provides a last resort "fuse" to protect the system.

More specifically, referring to FIGS. 2-4 in conjunction with FIG. 1, it can be seen that backdrive clutch mechanism 24 is disposed between overrunning clutch shaft 21 and splined output shaft 22, the clutch shaft comprising a drive member and the output shaft comprising a driven member. Shaft 22 is a drive member for the engine to be started and a driven member from shaft 21 of turbine 14. The shafts are concentric about an axis 26. A pair of clutch jaws, generally designated 28a and 28b, define an interface between the overrunning clutch shaft and the splined output shaft for rotation therewith. As seen in FIG. 3, clutch jaw 28a on overrunning clutch shaft 21 includes a plurality of chamfered teeth 30 for meshing with complementary chamfered teeth 32 on clutch jaw 28b of splined output shaft 22. Normally, the clutch jaws rotate conjointly as indicated by arrows "A". However, should a backdrive occur from the engine, the chamfered teeth provide a camming action whereby the clutch jaws and their respective drive and driven members are relatively rotatable angularly and separable axially.

Overriding clutch shaft 21 (FIG. 2) and output drive shaft 22 are coupled together by means of axial shaft means in the form of a bolt 34. The head 34a of the bolt abuts against an interior shoulder 36 of overrunning clutch shaft 21. It can be seen that the bolt extends axially through clutch jaws 28a,28b defined by the circular array of concentric chamfered teeth 30,32.

The opposite end of bolt 34 has a nut 38 threaded thereon, with a washer 40 axially inwardly of the nut and a disc-type washer 42 splined to the bolt, as at 44. Splined washer 42 has a plurality of radially projecting tabs or tongues 46 spaced angularly thereabout.

Referring to FIG. 4 in conjunction with FIG. 2, it can be seen that splined washer 42 has four tongues 46 equally spaced angularly about the periphery thereof. A shoulder 48 is formed integrally with output shaft 22 on the interior thereof and is provided with four equally spaced, radially inwardly opening notches or grooves 50 which can be aligned with tongues 46 of washer 42. Since washer 42 is splined to bolt 34, relative rotation between bolt 34 and output shaft 22 will cause tongues 46 to align with grooves 50.

To this end, an integral pin 52 (FIG. 2) on the underside of bolt head 34a projects into a bore 54 interiorly of overrunning clutch shaft 21. Therefore, bolt 34 is fixed rotationally to the clutch shaft. With washer 42 (including tongues 46) splined to bolt 34, washer 42 also is movable rotationally with overrunning clutch shaft 21. First biasing means in the form of a preload disc spring 56 is sandwiched between washer 40 and splined washer 42. When this assembly is in the normal condition as indicated in FIG. 4, tongues 46 will seat against shoulder 48 of output shaft 22, and spring 56 thereby will bias overrunning clutch shaft 21 and output shaft 22 axially together at the interface defined by clutch jaws 28a,28b. It should be noted that a second biasing means in the form of a coil spring 58 is sandwiched between a pair of bushings 60a and 60b; bushing 60a abutting interiorly of overrunning clutch shaft 21, and bushing 60b abutting against an interior flange 62 of output shaft 22.

In operation, the overrunning clutch assembly 20 (FIG. 1), located between clutch shaft 21 and the power turbine, normally prevents the engine from backdriving the turbine. In the event of clutch failure, backdrive overload clutch assembly 24 provides emergency disengagement to prevent backdriving and possibly overspeeding of the turbine. The backdrive clutch mechanism 24 provides a sort of fuse which operates at a very low torque, since the torque required to backdrive the turbine is relatively small. Emergency disengagement is provided wherein teeth 30,32 are chamfered so that if a backdrive torque is applied to shaft 21, an axial load is applied between shaft 21 and output shaft 22, causing preload spring 56 to deflect and permitting shafts 21 and 22 to rotate slightly and move axially with respect to each other. Pin 52 causes bolt 34 to rotate with shaft 21. Splined washer 42 (with tongues 46) will rotate with bolt 34 and shaft 21 relative to output shaft 22 and grooves 50 whereupon the tongues will align with the grooves and release the load of spring 56. This permits the two shafts 21,22 to move axially relative to each other whereupon clutch jaws 28a,28b and teeth 30,32 will completely disengage. Secondary spring 58 pushes shafts 21 and 22 apart so that the teeth will no longer engage. The turbine, starter and primary overrunning clutch assembly thereupon are completely disengaged from the engine until the malfunction is corrected or repaired and backdrive overload clutch mechanism 24 is reassembled.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:
1. An overload clutch mechanism, comprising:
   a rotatable drive member;
   a rotatable driven member mounted concentric with respect to the drive member;
   a pair of cooperating clutch jaws one on each of said members for rotation therewith and separable by relative movement between the members longitudinally of their axis of rotation;

first biasing means normally urging the clutch jaws into driving engagement;

means for disengaging the clutch jaws automatically in response to only relative rotation between the clutch jaws; and second biasing means independent of said first biasing means for maintaining the clutch jaws out of driving engagement once the clutch jaws are automatically disengaged.

2. The clutch mechanism of claim 1 wherein said clutch jaws comprise an annular array of teeth concentric with said axis, and including axial coupling means extending through the annular jaws between said members.

3. The clutch mechanism of claim 2 wherein said coupling means include shaft means and said first biasing means are operatively associated between the shaft means and one of said members.

4. The clutch mechanism of claim 2 wherein said teeth are chamfered to provide a camming effect between the teeth to allow said relative rotation between the members.

5. An overload clutch mechanism, comprising:
a rotatable drive member;
a rotatable driven member mounted concentric with respect to the drive member;
a pair of cooperating clutch jaws one on each of said members for rotation therewith and separable by relative movement between the members longitudinally of their axis of rotation;
first biasing means normally urging the clutch jaws into driving engagement;
means for disengaging the clutch jaws automatically in response to relative rotation between the clutch jaws wherein said disengaging means comprises a tongue-and-groove arrangement, said tongue and groove arrangement having tongue means operatively associated with the drive member and groove means operatively associated with the drive member, whereby angular alignment thereof occurs in response to relative rotation of the members to effect automatic disengagement of the members; and
second biasing means independent of said first biasing means for maintaining the clutch jaws out of driving engagement once the clutch jaws are automatically disengaged.

6. The clutch mechanism of claim 5 wherein said second biasing means is mounted in opposition between the drive and driven members to apply an axial force to bias a tongue of the arrangement through a groove to ensure the disengagement.

7. The clutch mechanism of claim 5 wherein one of said members includes one of the tongue means and the groove means on the interior thereof and the other of said members is coupled through the clutch jaws to the other of the tongue means and the groove means.

8. An overload clutch mechanism, comprising:
a rotatable drive member;
a rotatable driven member mounted concentric with respect to the drive member;
a pair of cooperating clutch jaws one on each of said members for rotation therewith and separable by relative movement between the members longitudinally of their axis of rotation, each clutch jaw having an annular array of chamfered teeth concentric with said axis and providing a camming effect therebetween to allow said relative rotation between the members;
first biasing means normally urging the clutch jaws into driving engagement;
a tongue-and-groove disengaging means for disengaging the clutch jaws automatically in response to relative rotation between the clutch jaws whereupon angular alignment of the tongue-and-groove disengaging means occurs in response to said relative rotation to effect automatic disengagement of the members; and
second biasing means independent of said first biasing means for maintaining the clutch jaws out of driving engagement once the clutch jaws are automatically disengaged.

9. The clutch mechanism of claim 8 including axial coupling means extending through the annular jaws between said members.

10. The clutch mechanism of claim 9 wherein said coupling means include shaft means and said first biasing means are operatively associated between the shaft means and one of said members.

11. The clutch mechanism of claim 8 wherein said second biasing means is mounted in opposition between the drive and driven members to apply an axial force to bias a tongue of the tongue-and-groove disengaging means through a groove to ensure the disengagement.

12. The clutch mechanism of claim 11 wherein one of said members includes one of the tongue and the groove on the interior thereof and the other of said members is coupled through the clutch jaws to the other of the tongue and the groove.

13. The clutch mechanism of claim 8 wherein one of said members includes annular interior shoulder means defining grooves of said tongue-and-groove disengaging means, and the other of said members carries radially projecting tongue means for alignment with the grooves.

* * * * *